US012793901B2

(12) United States Patent
Fujita et al.

(10) Patent No.: US 12,793,901 B2
(45) Date of Patent: Nov. 10, 2026

(54) MULTILAYER CERAMIC CAPACITOR INCLUDING CAPACITOR BODY WITH VIA CONDUCTORS AND RECESS PORTIONS

(71) Applicant: Murata Manufacturing Co., Ltd., Nagaokakyo (JP)

(72) Inventors: Yukihiro Fujita, Nagaokakyo (JP); Ryutaro Yamato, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 119 days.

(21) Appl. No.: 18/672,063

(22) Filed: May 23, 2024

(65) Prior Publication Data

US 2024/0312722 A1 Sep. 19, 2024

Related U.S. Application Data

(63) Continuation of application No. PCT/JP2023/024335, filed on Jun. 30, 2023.

(30) Foreign Application Priority Data

Jul. 4, 2022 (JP) ................................ 2022-107557

(51) Int. Cl.
*H01G 4/30* (2006.01)
*H01G 4/012* (2006.01)
(Continued)

(52) U.S. Cl.
CPC ............... *H01G 4/30* (2013.01); *H01G 4/012* (2013.01); *H01G 4/232* (2013.01); *H01G 4/1227* (2013.01); *H01G 4/1236* (2013.01)

(58) Field of Classification Search
CPC .. H01G 4/01; H01G 4/12; H01G 4/30; H01G 4/232
See application file for complete search history.

(56) References Cited

U.S. PATENT DOCUMENTS 3,195,027 A * 7/1965 Weller ..................... H01R 9/00
29/25.42
6,829,135 B2 * 12/2004 Honda ..................... H01G 4/30
29/25.42
(Continued)

FOREIGN PATENT DOCUMENTS

JP H11204372 A 7/1999
JP 2003188048 A 7/2003
(Continued)

OTHER PUBLICATIONS

International Search Report in PCT/JP2023/024335, mailed Sep. 12, 2023, 3 pages.
(Continued)

*Primary Examiner* — David M Sinclair
(74) *Attorney, Agent, or Firm* — Keating & Bennett, LLP

(57) ABSTRACT

A multilayer ceramic capacitor includes a capacitor body including dielectric layers and first and second inner electrodes that are laminated, a first via conductor inside the capacitor body and electrically connected to the first inner electrodes, and a second via conductor inside the capacitor body and electrically connected to the second inner electrodes. In a lamination direction in which the dielectric layers, the first inner electrodes, and the second inner electrodes are laminated, a dimension of the multilayer ceramic capacitor is the same or substantially the same as the dimension of the capacitor body.

18 Claims, 13 Drawing Sheets

(51) Int. Cl.
*H01G 4/12* (2006.01)
*H01G 4/232* (2006.01)

(56) References Cited

U.S. PATENT DOCUMENTS

| | | | | |
|---|---|---|---|---|
| 2005/0269013 | A1* | 12/2005 | Fukudome | B32B 18/00 156/89.11 |
| 2006/0092595 | A1 | 5/2006 | Hwa Lee et al. | |
| 2006/0198079 | A1* | 9/2006 | Shim | H01G 2/06 361/306.3 |
| 2015/0380167 | A1* | 12/2015 | Lim | H01G 4/005 29/25.42 |
| 2018/0027658 | A1* | 1/2018 | Choi | H05K 1/181 174/260 |
| 2018/0068796 | A1* | 3/2018 | Seo | H05K 1/111 |
| 2020/0135400 | A1 | 4/2020 | Sakurai et al. | |
| 2020/0303125 | A1* | 9/2020 | Tsuru | H01G 4/1227 |
| 2021/0082625 | A1* | 3/2021 | Fujita | H01G 4/232 |
| 2021/0233710 | A1 | 7/2021 | Kim et al. | |

FOREIGN PATENT DOCUMENTS

| | | | |
|---|---|---|---|
| JP | 2004153041 | A | 5/2004 |
| JP | 2004153043 | A | 5/2004 |
| JP | 2005123415 | A | 5/2005 |
| JP | 2006135333 | A | 5/2006 |
| JP | 2008041828 | A | 2/2008 |
| JP | 5166212 | B2 * | 3/2013 |
| JP | 2020072263 | A | 5/2020 |
| KR | 20210095503 | A | 8/2021 |

OTHER PUBLICATIONS

Written Opinion in PCT/JP2023/024335, mailed Sep. 12, 2023, 4 pages.

* cited by examiner

MULTILAYER CERAMIC CAPACITOR INCLUDING CAPACITOR BODY WITH VIA CONDUCTORS AND RECESS PORTIONS

CROSS REFERENCE TO RELATED APPLICATIONS

This application claims the benefit of priority to Japanese Patent Application No. 2022-107557 filed on Jul. 4, 2022 and is a Continuation Application of PCT Application No. PCT/JP2023/024335 filed on Jun. 30, 2023. The entire contents of each application are hereby incorporated herein by reference.

BACKGROUND OF THE INVENTION

1. Field of the Invention

The present disclosure relates to multilayer ceramic capacitors.

2. Description of the Related Art

There is known a multilayer capacitor whose ESL (equivalent series inductance) is reduced by, e.g., widening a route for passing currents, shortening the route for passing currents, or causing magnetic fields generated by currents with different polarities to cancel each other. Japanese Unexamined Patent Application Publication No. 2006-135333 discloses an example of a multilayer capacitor with reduced ESL.

The multilayer capacitor disclosed in Japanese Unexamined Patent Application Publication No. 2006-135333 includes a capacitor body formed by laminating a plurality of dielectric layers, a plurality of first inner electrodes, and a plurality of second inner electrodes. The capacitor body is provided with a plurality of first via conductors electrically connected to the plurality of first inner electrodes and extending to a first main surface of the capacitor body and a plurality of second via conductors electrically connected to the plurality of second inner electrodes and extending to the first main surface of the capacitor body. Provided at the first main surface of the capacitor body are a plurality of first electrodes electrically connected to the respective plurality of first via conductors and a plurality of second outer electrodes electrically connected to the respective plurality of second via conductors.

In the multilayer capacitor disclosed in Japanese Unexamined Patent Application Publication No. 2006-135333, however, because the first outer electrodes and the second outer electrodes are provided at a surface of the capacitor body, the thickness of the capacitor body is reduced by the thickness of the outer electrodes if the size of the multilayer capacitor is fixed. In other words, the provision of the outer electrodes constrains the number of layers of the inner electrodes and hinders increasing of the capacitance.

SUMMARY OF THE INVENTION

Example embodiments of the present invention provide multilayer ceramic capacitors each with increased capacitance.

A multilayer ceramic capacitor according to an example embodiment of the present invention includes a capacitor body including dielectric layers, first inner electrodes, and second inner electrodes that are laminated, a first via conductor inside the capacitor body and electrically connected to the plurality of first inner electrodes, and a second via conductor inside the capacitor body and electrically connected to the plurality of second inner electrodes, in which in a lamination direction in which the dielectric layers, the first inner electrodes, and the second inner electrodes are laminated, a dimension of the multilayer ceramic capacitor is the same or substantially the same as a dimension of the capacitor body.

According to example embodiments of the present disclosure, no outer electrodes are provided at the surface of the capacitor body, and in the lamination direction, the dimension of the multilayer ceramic capacitor is the same or substantially the same as the dimension of the capacitor body. With such a configuration, the capacitor body has as large a dimension as possible in the lamination direction, which enables an increase in the number of layers of the first inner electrodes and the second inner electrodes and therefore increases the capacitance.

The above other and elements, features, steps, characteristics and advantages of the present invention will become more apparent from the following detailed description of the example embodiments with reference to the attached drawings.

DETAILED DESCRIPTION OF THE EXAMPLE EMBODIMENTS

The present invention is described below with reference to example embodiments of the present invention and the drawings.

First Example Embodiment

Figure 1:
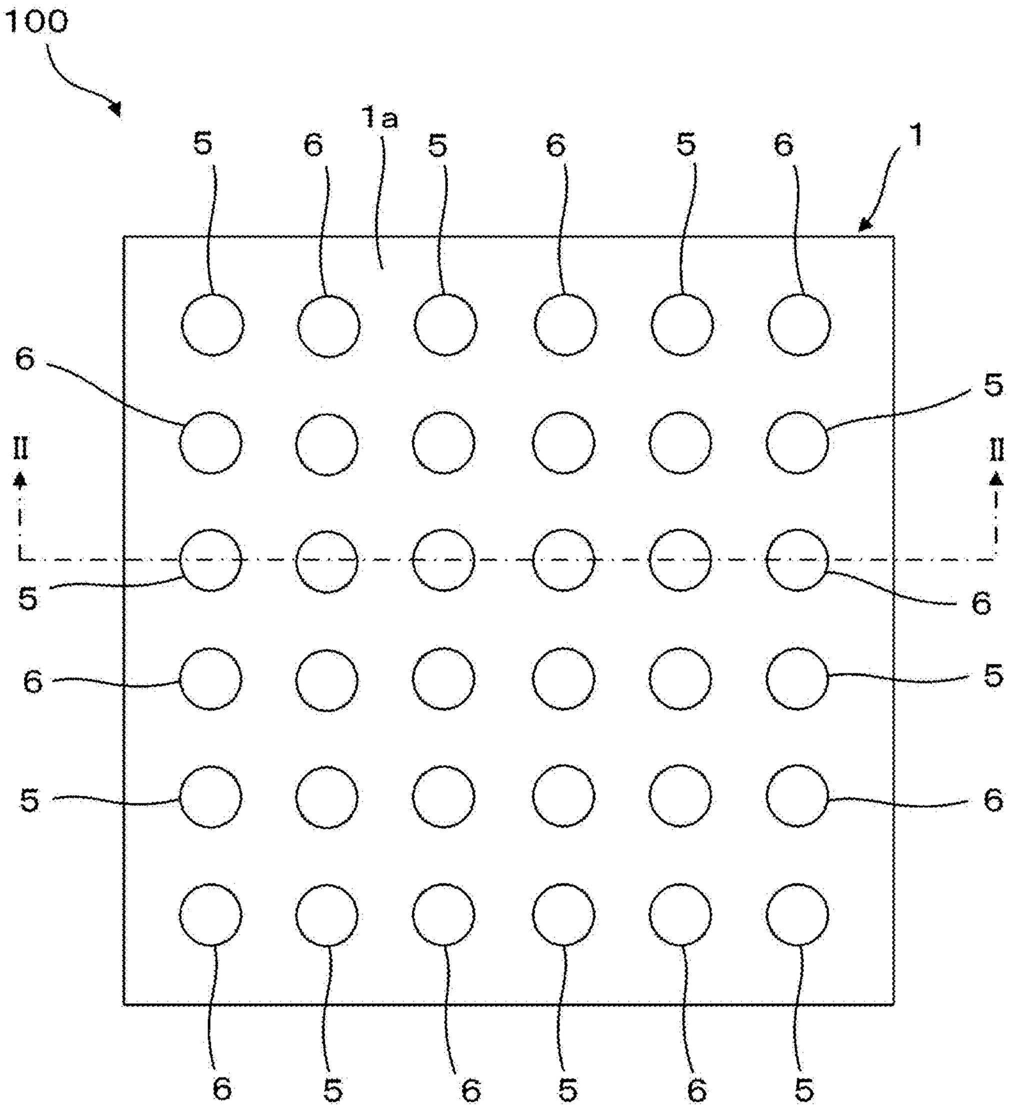
FIG. 1 is a plan view of a multilayer ceramic capacitor of a first example embodiment of the present invention.
Figure 2:
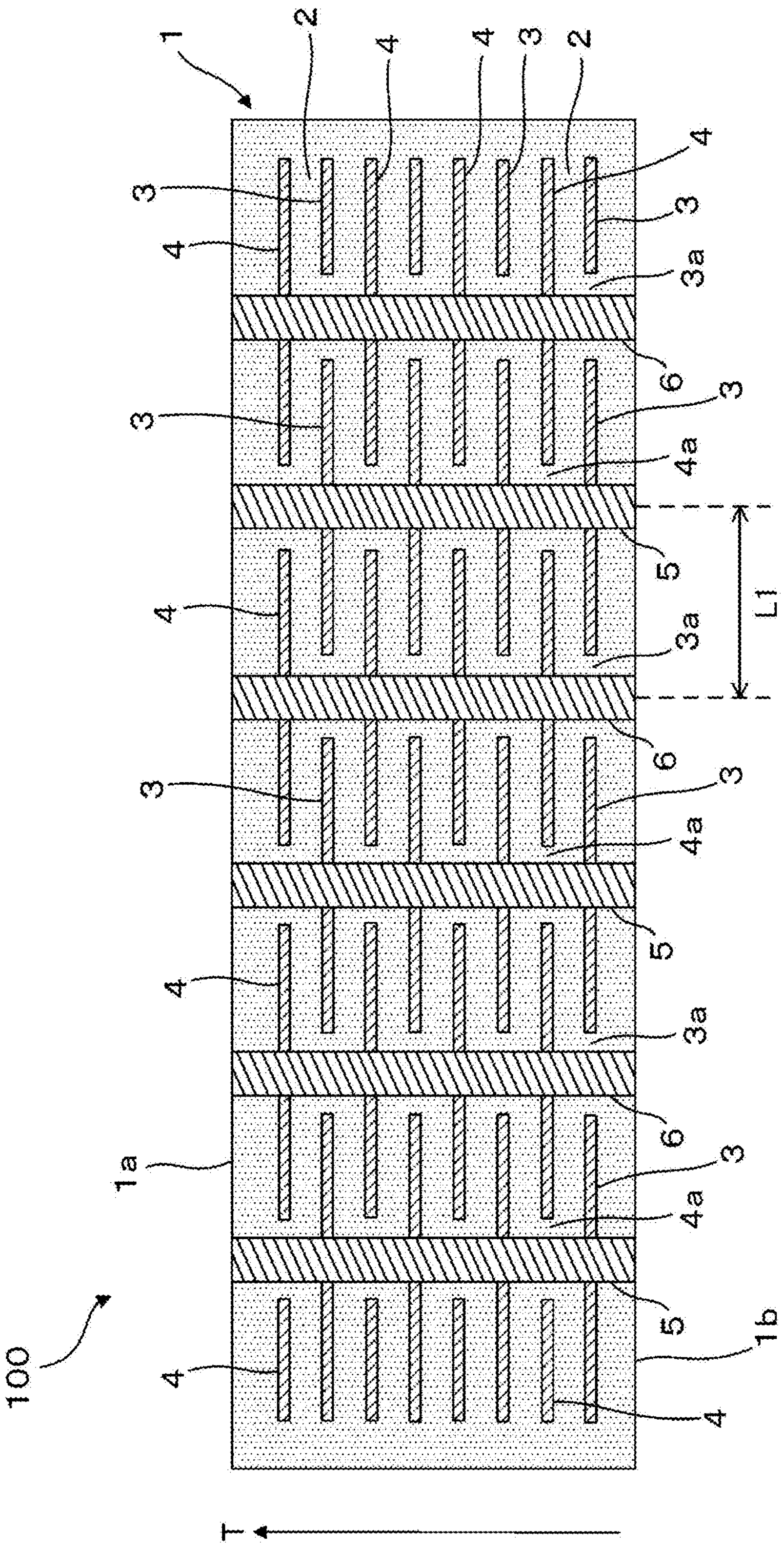
FIG. 2 is a sectional view taken along the line II-II of the multilayer ceramic capacitor shown in FIG. 1.

FIG. 1 is a plan view of a multilayer ceramic capacitor 100 of a first example embodiment of the present invention. FIG. 2 is a sectional view taken along the line II-II of the multilayer ceramic capacitor 100 shown in FIG. 1.

The multilayer ceramic capacitor 100 includes a capacitor body 1, first via conductors 5, and second via conductors 6.

The capacitor body 1 includes a plurality of dielectric layers 2, a plurality of first inner electrodes 3, and a plurality of second inner electrodes 4 that are laminated. More specifically, the capacitor body 1 is structured such that the first inner electrode 3 and the second inner electrode 4 are laminated alternately a plurality of times with the dielectric layer 2 interposed therebetween.

The dielectric layers 2 may be made of any material, but for example, is made of a ceramic material including $BaTiO_3$, $CaTiO_3$, $SrTiO_3$, $SrZrO_3$, $CaZrO_3$, or the like as the main component. In addition to any of these main components, an accessory component may be added in an amount smaller than the main component, the accessory component being, for example, any one of Mn compounds, Fe compounds, Cr compounds, Co compounds, Ni compounds, and the like.

The capacitor body 1 may have any shape. In the present example the capacitor body 1 has a cuboid or substantially cuboid shape. Having a cuboid or substantially cuboid shape means, for example, a shape which is not exactly a cuboid shape but includes six surfaces and can be regarded as a cuboid, such as a cuboid shape with round corners or round ridges.

The capacitor body 1 may have any dimensions, but for example, may have the following dimensions: the dimension in the longitudinal direction of a quadrilateral in a plan view is about 0.3 mm or more and about 3.0 mm or less, the dimension in the lateral direction is about 0.3 mm or more and about 3.0 mm or less, and the dimension in a direction T in which the dielectric layers 2, the first inner electrodes 3, and the second inner electrodes 4 are laminated (hereinafter referred to simply as a lamination direction T) is about 50 μm or more and about 200 μm or less. The dimension of the capacitor body 1 in the lamination direction T is the thickness of the capacitor body 1.

As will be described later, outer electrodes or any other members are not provided on a first main surface 1*a* and a second main surface 1*b* of the capacitor body 1 which are opposite from each other in the lamination direction T. For this reason, in the lamination direction T, the dimension of the multilayer ceramic capacitor 100 is the same or substantially the same as the dimension of the capacitor body 1. The dimension of the multilayer ceramic capacitor 100 in the lamination direction T means a distance in the lamination direction T between an outermost portion on the first main surface 1*a* side and an outermost portion on the second main surface 1*b* side of a portion of the multilayer ceramic capacitor 100.

The first inner electrodes 3 and the second inner electrodes 4 may be made of any materials, but for example, their materials contain, as the main component, a metal such as Ni, Cu, Ag, Pd, Pt, Fe, Ti, Cr, Sn, or Au or an alloy containing any of these metals. The first inner electrodes 3 and the second inner electrodes 4 may contain, as a common material, the same ceramic material as the dielectric ceramic material contained in the dielectric layers 2. In this case, the proportion of the common material contained in the first inner electrodes 3 and the second inner electrodes 4 is, for example, about 20 vol % or less.

The first inner electrodes 3 and the second inner electrodes 4 may have any thicknesses, but for example, they may be about 0.3 μm or more and about 1.0 μm or less. There may be any number of layers of the first inner electrodes 3 and the second inner electrodes 4, but for example, they may be 10 layers or more and 150 layers or less in total of both.

The first inner electrodes 3 include a plurality of first through-holes 3*a* in order to allow insertion of the plurality of second via conductors 6 to be described later. The second inner electrodes 4 include a plurality of second through-holes 4*a* in order to allow insertion of the plurality of first via conductors 5 to be described later.

In the multilayer ceramic capacitor 100, capacitance is generated by the first inner electrodes 3 and the second inner electrodes 4 facing each other with the dielectric layers 2 interposed therebetween.

As shown in FIG. 2, the first via conductors 5 are provided inside the capacitor body 1 and are electrically connected to the plurality of first inner electrodes 3. The first via conductors 5 are inserted through the second through-holes 4*a* formed in the second inner electrodes 4 and are insulated from the second inner electrodes 4.

In the example shown in FIG. 2, the first via conductors 5 are provided inside the capacitor body 1 and extend in the lamination direction T from the first main surface 1*a* to the second main surface 1*b* of the capacitor body 1. In other words, the first via conductors 5 are exposed at the first main surface 1*a* and the second main surface 1*b* of the capacitor body 1. However, as will be described later, the first via conductors 5 do not have to be exposed at the first main surface 1*a* of the capacitor body 1 or do not have to be exposed at the second main surface 1*b*.

As shown in FIG. 2, the second via conductors 6 are provided inside the capacitor body 1 and are electrically connected to the plurality of second inner electrodes 4. The second via conductors 6 are inserted through the first through-holes 3*a* formed in the first inner electrodes 3 and are insulated from the first inner electrodes 3.

In the example shown in FIG. 2, the second via conductors 6 are provided inside the capacitor body 1 and extend in the lamination direction T from the first main surface 1*a* to the second main surface 1*b* of the capacitor body 1. In other words, the second via conductors 6 are exposed at the first main surface 1*a* and the second main surface 1*b* of the capacitor body 1. However, as will be described later, the second via conductors 6 do not have to be exposed at the first main surface 1*a* of the capacitor body 1 or do not have to be exposed at the second main surface 1*b*.

The first via conductors 5 and the second via conductors 6 do not protrude more outward in the lamination direction T than the first main surface 1*a* or the second main surface 1*b* of the capacitor body 1. In other words, in the lamination direction T, the dimension of the first via conductors 5 and the dimension of the second via conductors 6 are equal to or smaller than the dimension of the capacitor body 1. In the example shown in FIG. 2, in the lamination direction T, the dimension of the first via conductors 5 and the dimension of the second via conductors 6 are the same or substantially the same as the dimension of the capacitor body 1.

The first via conductors 5 and the second via conductors 6 may be made of any materials, but for example, their materials may contain, as a main component, a metal such as Ni, Cu, Ag, Pd, Pt, Fe, Ti, Cr, Sn, or Au or an alloy containing any of these metals.

The first via conductors 5 and the second via conductors 6 can be provided at any positions. In the present example embodiment, as shown in FIG. 1, the plurality of first via conductors 5 and the plurality of second via conductors 6 are provided in a matrix arrangement. There may be any numbers of the first via conductors 5 and the second via conductors 6.

The first via conductors 5 and the second via conductors 6 may have any shapes, but for example, may be columnar. In that case, the first via conductors 5 and the second via conductors 6 have a diameter of, for example, about 30 μm or more and about 150 μm or less. Also, the distance between adjacent ones of the first via conductors 5 and the second via conductors 6, or more specifically, a distance L1 between the center of the first via conductor 5 and the center of the second via conductor 6 (see FIG. 2) is, for example, about 50 μm or more and about 500 μm or less.

As shown in FIG. 2, in the lamination direction T, the dimension of the multilayer ceramic capacitor 100 is the same or substantially the same as the dimension of the capacitor body 1. In other words, outer electrodes connected to the first via conductors 5, outer electrodes connected to the second via conductors 6, and other members and the like are not provided at the first main surface 1*a* or the second main surface 1*b* of the capacitor body 1. For example, in a case of mounting the multilayer ceramic capacitor 100 onto a land on a mounting board, the first via conductors 5 and the second via conductors 6 exposed at the first main surface 1*a* or the second main surface 1*b* of the capacitor body 1 are connected to the land by soldering.

As described above, in the multilayer ceramic capacitor 100 of the present example embodiment, outer electrodes are not provided at the first main surface 1*a* or the second main surface 1*b* of the capacitor body 1, and the dimension of the multilayer ceramic capacitor 100 is the same or substantially the same as the dimension of the capacitor body 1 in the lamination direction T. With such a configuration, when compared to a multilayer ceramic capacitor of the same size, the multilayer ceramic capacitor 100 of the present example embodiment enables the capacitor body 1 to have as large a dimension as possible in the lamination direction T in comparison to a conventional multilayer ceramic capacitor having outer electrodes provided at the surface of the capacitor body. Thus, in comparison to a conventional multilayer ceramic capacitor provided with outer electrodes, the number of layers of the first inner electrodes 3 and the second inner electrodes 4 can be increased, which enables larger capacitance.

Also, because the dimension of the first via conductors 5 and the dimension of the second via conductors 6 are the same or substantially the same as the dimension of the capacitor body 1 in the lamination direction T, the first via conductors 5 and the second via conductors 6 are exposed at the first main surface 1*a* and the second main surface 1*b* of the capacitor body 1. Thus, in mounting of the multilayer ceramic capacitor 100, the first via conductors 5 and the second via conductors 6 can be connected while being in direct contact with, e.g., a land on the mounting board, which improves connection reliability.

Method for Manufacturing the Multilayer Ceramic Capacitor

An example method for manufacturing the multilayer ceramic capacitor 100 described above is described.

First, a ceramic green sheet and a conductive paste for inner electrodes are prepared. As the ceramic green sheet, a publicly known one can be used, and for example, it can be obtained by coating a base material with a ceramic slurry containing ceramic powder, a resin component, and a solvent and drying the ceramic slurry.

The conductive paste for inner electrodes is a conductive paste for forming the first inner electrodes 3 and the second inner electrodes 4, and a publicly known one can be used. The conductive paste for inner electrodes contains, for example, a solvent and particles of a metal such as Ni, Cu, Ag, Pd, Pt, Fe, Ti, Cr, Sn, or Au or a precursor thereof. The conductive paste for inner electrodes may further contain, for example, a resin component to define and function as a dispersant or a binder.

Next, the ceramic green sheet is coated with the conductive paste for inner electrodes using a method such as, for example, printing to form an inner electrode pattern. Here, a description is provided assuming that the inner electrode pattern formed enables a plurality of the multilayer ceramic capacitors 100 to be manufactured at once.

Next, a mother multilayer body is fabricated by lamination of a plurality of ceramic green sheets each including the inner electrode pattern formed thereon. In the fabrication of the mother multilayer body, a ceramic green sheet with no inner electrode pattern formed thereon may be disposed at an outer side portion in the lamination direction T. The mother multilayer body thus fabricated is preferably pressed using a method such as rigid-body pressing or isostatic pressing, for example.

Next, in the mother multilayer body, through-holes for forming the first via conductors 5 and through-holes for forming the second via conductors 6 are formed. The through-holes are formed by, for example, application of laser light.

Next, the through-holes thus formed are filled with a conductive paste for via conductors for forming the first via conductors 5 and the second via conductors 6. The conductive paste for via conductors contains a solvent and particles of a metal such as, for example, Ni, Cu, Ag, Pd, Pt, Fe, Ti, Cr, Sn, or Au or a precursor thereof. The conductive paste for via conductors may further contain, for example, a resin component to define and function as a dispersant or a binder.

Next, the mother multilayer body is cut into multilayer chips of a predetermined size using a cutting method such as, for example, cutting by pressing down a blade, cutting using a dicing machine, or laser cutting. The multilayer chips thus obtained are fired with predetermined profiles, and the multilayer ceramic capacitor 100 is thus obtained.

Modification 1

Figure 3:
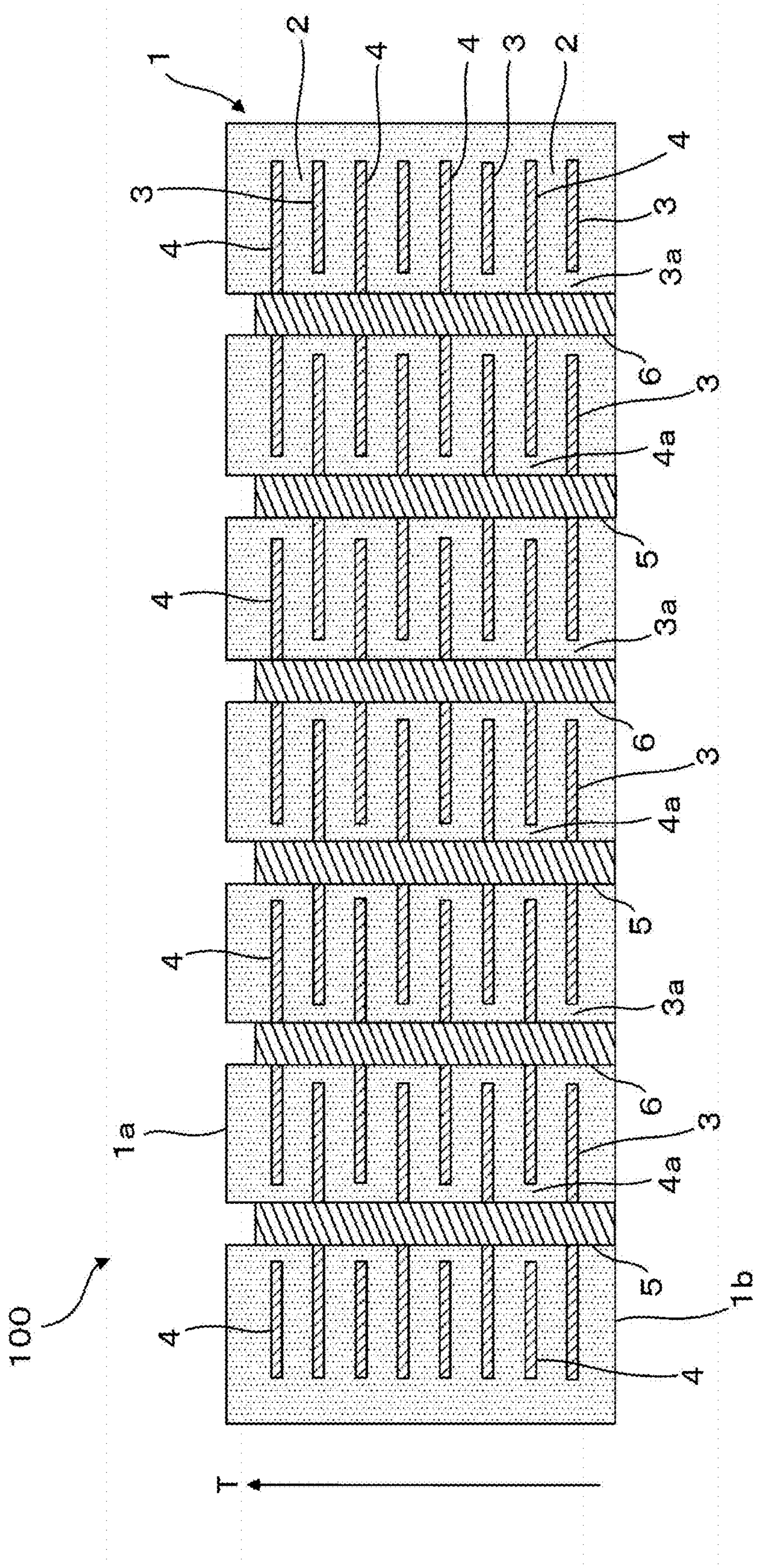
FIG. 3 is a sectional view schematically showing the configuration of Modification 1 of the multilayer ceramic capacitor of the first example embodiment of the present invention.

FIG. 3 is a sectional view schematically showing the configuration of Modification 1 of the multilayer ceramic capacitor 100 of the first example embodiment. The cutting position of the sectional view shown in FIG. 3 is the same or substantially the same as the cutting position of the sectional view shown in FIG. 2.

In the multilayer ceramic capacitor 100 shown in FIG. 3, in the lamination direction T, the dimension of the first via conductors 5 and the dimension of the second via conductors 6 are smaller than the dimension of the capacitor body 1. Also, as shown in FIG. 3, the first via conductors 5 and the second via conductors 6 are exposed at the second main surface 1*b*, but not exposed at the first main surface 1*a*. Thus, the positions on the first main surface 1*a* of the capacitor body 1 where the first via conductors 5 and the second via conductors 6 are provided include recess portions recessed inward in the lamination direction T. In this case, in the mounting of the multilayer ceramic capacitor 100, the mounting surface may be the second main surface 1*b* of the capacitor body 1.

The dimension of the first via conductors 5 and the second via conductors 6 in the lamination direction T can be adjusted by, for example, pressing the conductive paste for via conductors filling the through-holes in the manufacturing process. Also, the dimensions of the first via conductors 5 and the second via conductors 6 in the lamination direction T may be adjusted by increasing the amount of the resin component contained in the conductive paste for via conductors. More specifically, the amount of the resin component contained in the conductive paste for via conductors is increased to increase the resin component to disappear upon firing, so that the dimensions of the first via conductors 5 and the second via conductors 6 that is formed may be smaller.

Similar to the multilayer ceramic capacitor 100 shown in FIGS. 1 and 2, the multilayer ceramic capacitor 100 shown in FIG. 3 can increase the number of layers of the first inner electrodes 3 and the second inner electrodes 4 and thus increase the capacitance. Also, in the multilayer ceramic capacitor 100 shown in FIG. 3, the dimension of the first via conductors 5 and the dimension of the second via conductors 6 are smaller than the dimension of the capacitor body 1 in the lamination direction T, and the first via conductors 5 and the second via conductors 6 are not exposed at the first main surface 1*a*. This helps prevent the first via conductors 5 and the second via conductors 6 from having an unintended electrical contact with other electronic components and the like at the first main surface 1*a* side. The same applies to a case where the first via conductors 5 and the second via conductors 6 are not exposed at the second main surface 1*b* of the capacitor body 1 instead of the first main surface 1*a*.

Also, in the mounting of the multilayer ceramic capacitor 100, the mounting surface may be the first main surface 1*a* of the capacitor body 1.

Modification 2

Figure 4:
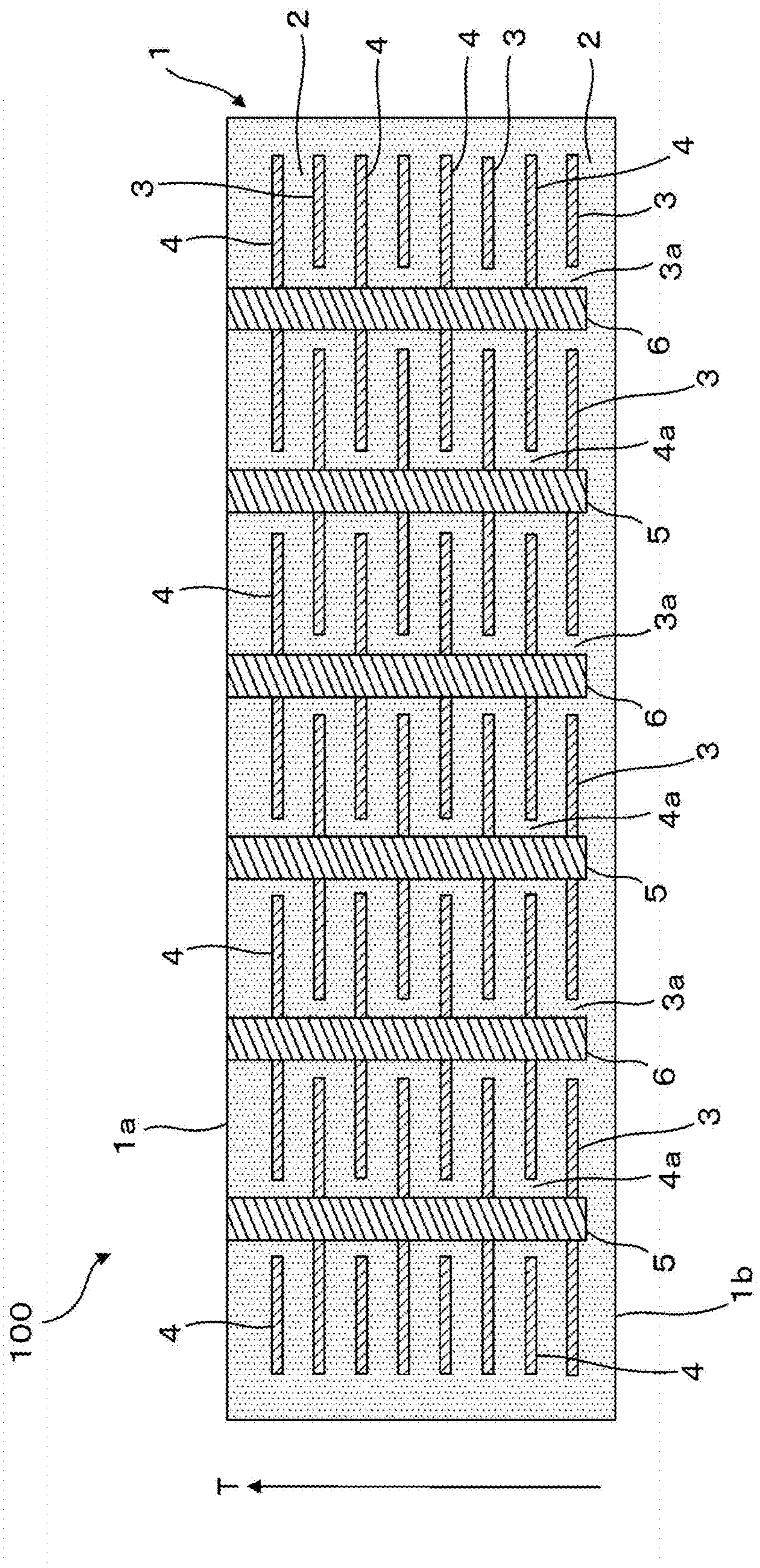
FIG. 4 is a sectional view schematically showing the configuration of Modification 2 of the multilayer ceramic capacitor of the first example embodiment of the present invention.

FIG. 4 is a sectional view schematically showing the configuration of Modification 2 of the multilayer ceramic capacitor 100 of the first example embodiment. The cutting position of the sectional view shown in FIG. 4 is the same or substantially the same as the cutting position of the sectional view shown in FIG. 2.

In the multilayer ceramic capacitor 100 shown in FIG. 4, as in the multilayer ceramic capacitor 100 shown in FIG. 3, in the lamination direction T, the dimensions of the first via conductors 5 and the second via conductors 6 are smaller than the dimension of the capacitor body 1. Also, as shown in FIG. 4, the first via conductors 5 and the second via conductors 6 are exposed at the first main surface 1*a*, but not exposed at the second main surface 1*b*. In this case, in the mounting of the multilayer ceramic capacitor 100, the mounting surface is the first main surface 1*a* of the capacitor body 1.

In the multilayer ceramic capacitor 100 shown in FIG. 4, the second main surface 1*b* of the capacitor body 1 is a flat surface. Specifically, of the end portions of the first via conductors 5 and the second via conductors 6 in the lamination direction T, the end portions on the second main surface 1*b* side are covered by the dielectric layers 2.

The multilayer ceramic capacitor 100 shown in FIG. 4 can be manufactured as follows: in the provision of the holes for forming the first via conductors 5 and the second via conductors 6 in the mother multilayer body in the manufacturing process, some of them are through-holes penetrating from one of the main surfaces to the other main surface, and the other ones are holes that do not penetrate. Also, after the formation of the through-holes in the mother multilayer body, a ceramic green sheet may be attached to close one end portions of the through-holes.

Similar to the multilayer ceramic capacitor 100 shown in FIGS. 1 and 2, the multilayer ceramic capacitor 100 shown in FIG. 4 can increase the number of layers of the first inner electrodes 3 and the second inner electrodes 4 and thus increase the capacitance. Also, in the multilayer ceramic capacitor 100 shown in FIG. 4, the first via conductors 5 and the second via conductors 6 are not exposed at the second main surface 1*b*, which helps prevent the first via conductors 5 and the second via conductors 6 from having an unintended electrical contact with other electronic components and the like at the second main surface 1*b* side. Especially because the end portions of the first via conductors 5 and the second via conductors 6 that are not exposed at the second main surface 1*b* are covered by the dielectric layers 2, an unintended electrical contact with other electronic components and the like can be prevented more reliably than in the multilayer ceramic capacitor 100 shown in FIG. 3. The same applies to a case where the first via conductors 5 and the second via conductors 6 are not exposed at the first main surface 1*a* of the capacitor body 1 instead of the second main surface 1*b*.

Modification 3

Figure 5:
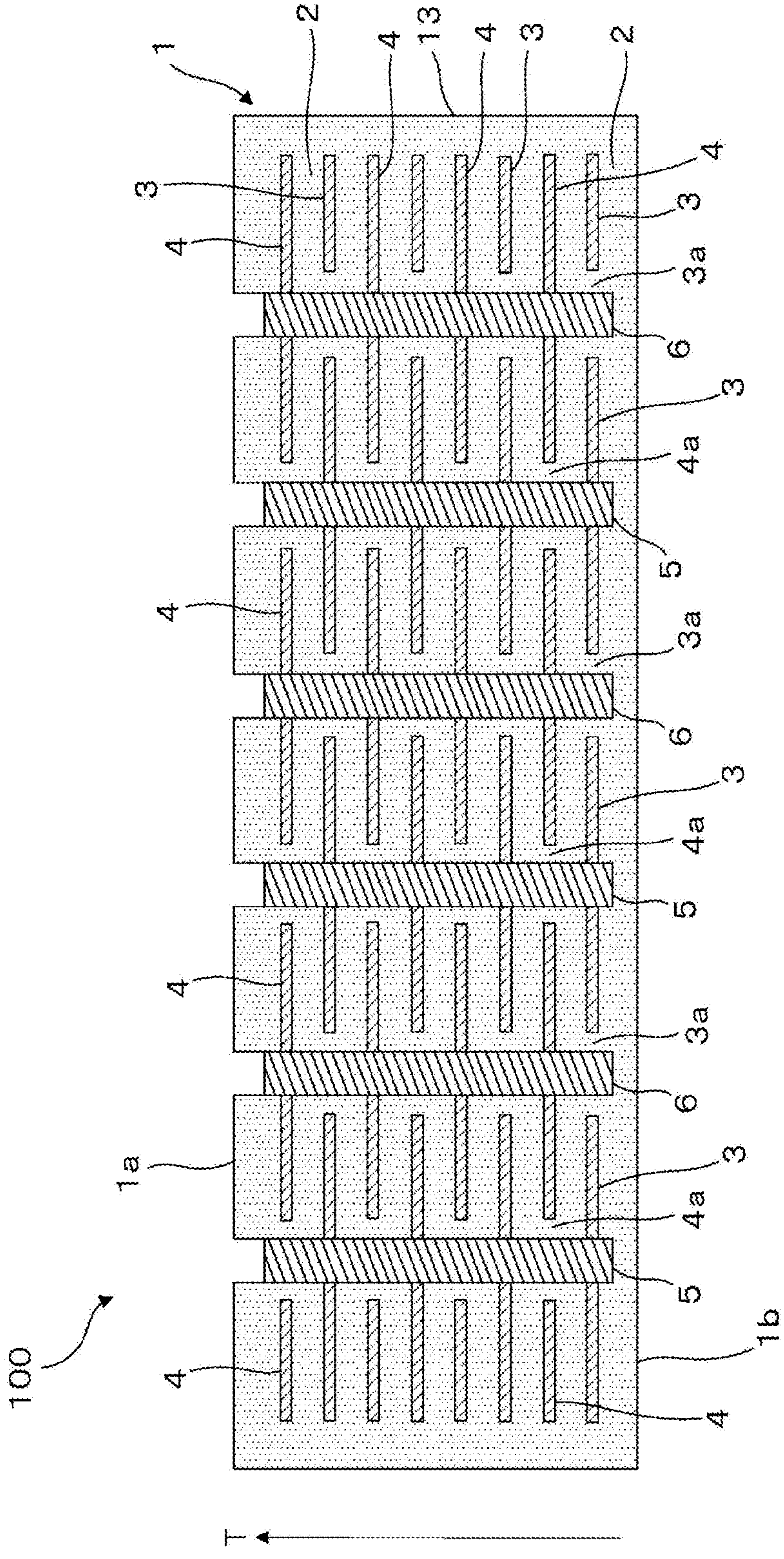
FIG. 5 is a sectional view schematically showing the configuration of Modification 3 of the multilayer ceramic capacitor of the first example embodiment of the present invention.

FIG. 5 is a sectional view schematically showing the configuration of Modification 3 of the multilayer ceramic capacitor 100 of the first example embodiment. The cutting position of the sectional view shown in FIG. 5 is the same or substantially the same as the cutting position of the sectional view shown in FIG. 2.

In the multilayer ceramic capacitor 100 shown in FIG. 5, as in the multilayer ceramic capacitor 100 shown in FIG. 3, in the lamination direction T, the dimensions of the first via conductors 5 and the second via conductors 6 are smaller than the dimension of the capacitor body 1. Also, the first via conductors 5 and the second via conductors 6 are exposed neither at the first main surface 1*a* nor at the second main surface 1*b*. Of the first via conductors 5 and the second via conductors 6, the end portions on the first main surface 1*a* side are open, whereas the end portions on the second main surface 1*b* side are covered by the dielectric layers 2. In this case, in the mounting of the multilayer ceramic capacitor 100, the mounting surface is the first main surface 1*a* of the capacitor body 1.

The multilayer ceramic capacitor 100 shown in FIG. 5 can be manufacturing using the manufacturing method used for the above-described multilayer ceramic capacitors 100 shown in FIGS. 3 and 4.

The multilayer ceramic capacitor 100 shown in FIG. 5 can provide the same advantageous effects as the multilayer ceramic capacitor 100 shown in FIG. 4.

Second Example Embodiment

Figure 6:
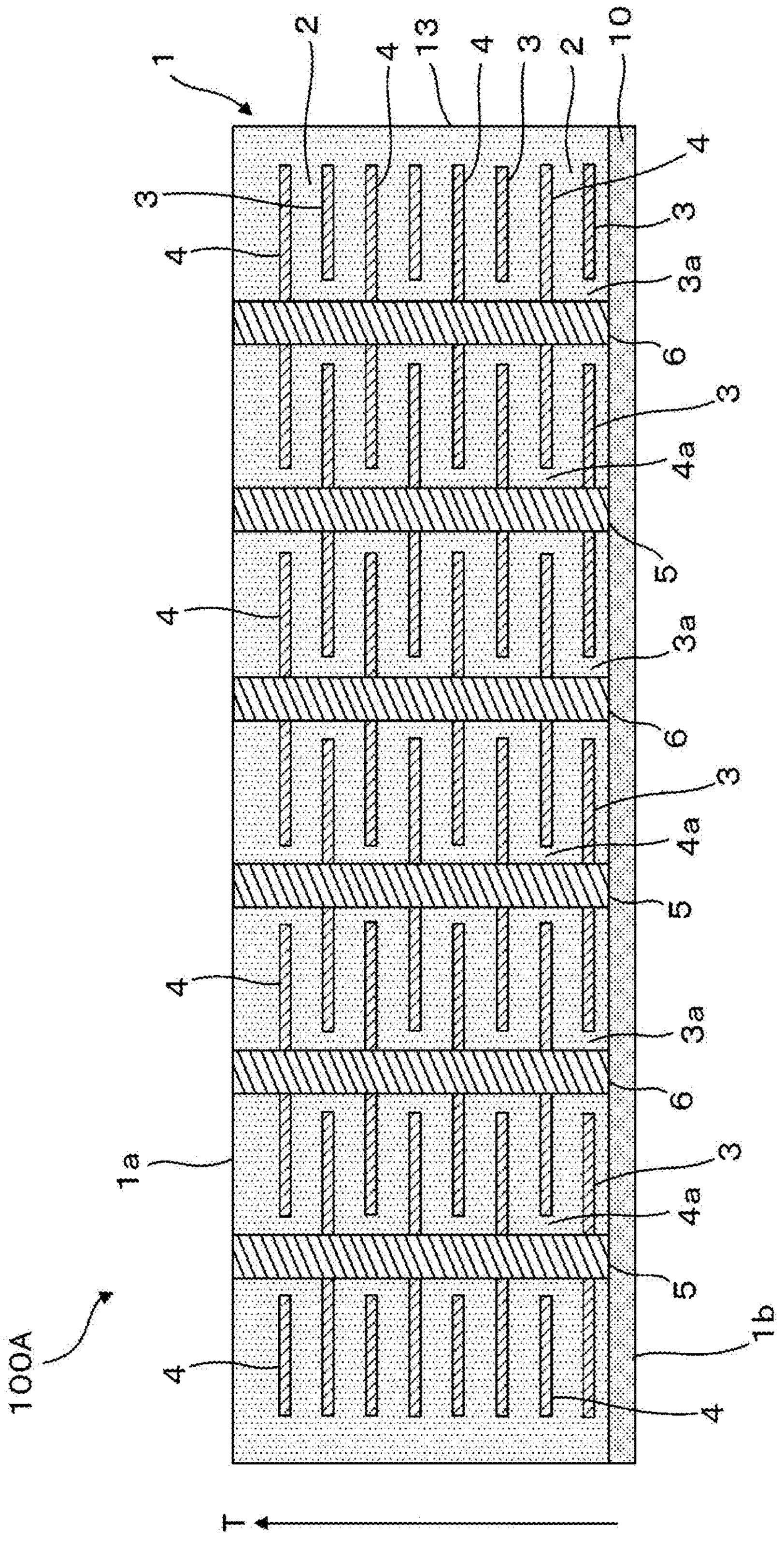
FIG. 6 is a sectional view schematically showing the configuration of a multilayer ceramic capacitor of a second example embodiment of the present invention.

FIG. 6 is a sectional view schematically showing the configuration of a multilayer ceramic capacitor 100A of a second example embodiment of the present invention. The cutting position of the sectional view shown in FIG. 6 is the same or substantially the same as the cutting position of the sectional view shown in FIG. 2.

In the multilayer ceramic capacitor 100A of the second example embodiment, as in the multilayer ceramic capacitor 100 of the first example embodiment, in the lamination direction T, the dimension of the multilayer ceramic capacitor 100A is the same or substantially the same as the dimension of the capacitor body 1. In the multilayer ceramic capacitor 100A of the present example embodiment, in the lamination direction T, the dimensions of the first via conductors 5 and the second via conductors 6 are smaller than the dimension of the capacitor body 1.

In the multilayer ceramic capacitor 100A of the present example embodiment, the capacitor body 1 is provided with an outer layer 10 which is provided at an outer side portion in the lamination direction T, has higher strength than the dielectric layers 2, and covers one end portions of the first via conductors 5 and the second via conductors 6 in the lamination direction T. In the example shown in FIG. 6, the outer layer 10 is provided on the second main surface 1*b* side of the capacitor body 1. The end portions of the first via conductors 5 and the second via conductors 6 on the first main surface 1*a* side are exposed at the first main surface 1*a*. The outer layer 10 may be provided not at the second main surface 1*b* side of the capacitor body 1, but at the first main surface 1*a* side.

The outer layer 10 is made of a ceramic material having higher strength than the ceramic material of the dielectric layers 2, and examples thereof include a ceramic material containing particles of aluminum oxide, glass, resin, or the like and a ceramic material containing particles of a metal or preferably particles of the same metal as the metal of the first via conductors 5 and the second via conductors 6. If the outer layer 10 is made of a ceramic material containing metal particles, an insulating sheet or the like is preferably interposed between the outer layer 10 and the first via conductors 5 and the second via conductors 6.

The multilayer ceramic capacitor 100A of the second example embodiment can be manufactured using a method the same as or similar to the method used for the multilayer ceramic capacitor 100 of the first example embodiment, but a step for forming the outer layer 10 is necessary. Specifically, after the formation of the through-holes in the mother multilayer body, a ceramic green sheet for forming the outer layer 10 is attached to the outer side portion of the mother multilayer body in the lamination direction T. After that, the holes formed are filled with the conductive paste for via conductors. Steps after that are the same as those in the manufacturing process for the multilayer ceramic capacitor 100 of the first example embodiment.

Similar to the multilayer ceramic capacitor 100 of the first example embodiment, the multilayer ceramic capacitor 100A of the second example embodiment can increase the number of layers of the first inner electrodes 3 and the second inner electrodes 4 and thus increase the capacitance. Also, because the outer layer 10 with higher strength than the dielectric layers 2 is provided at the outer side portion of the capacitor body 1 in the lamination direction T and covers the one end portions of the first via conductors 5 and the second via conductors 6 in the lamination direction T, the strength of the multilayer ceramic capacitor 100A can be improved, and cracking and the like of the capacitor body 1 can be reduced.

Modification

Figure 7:
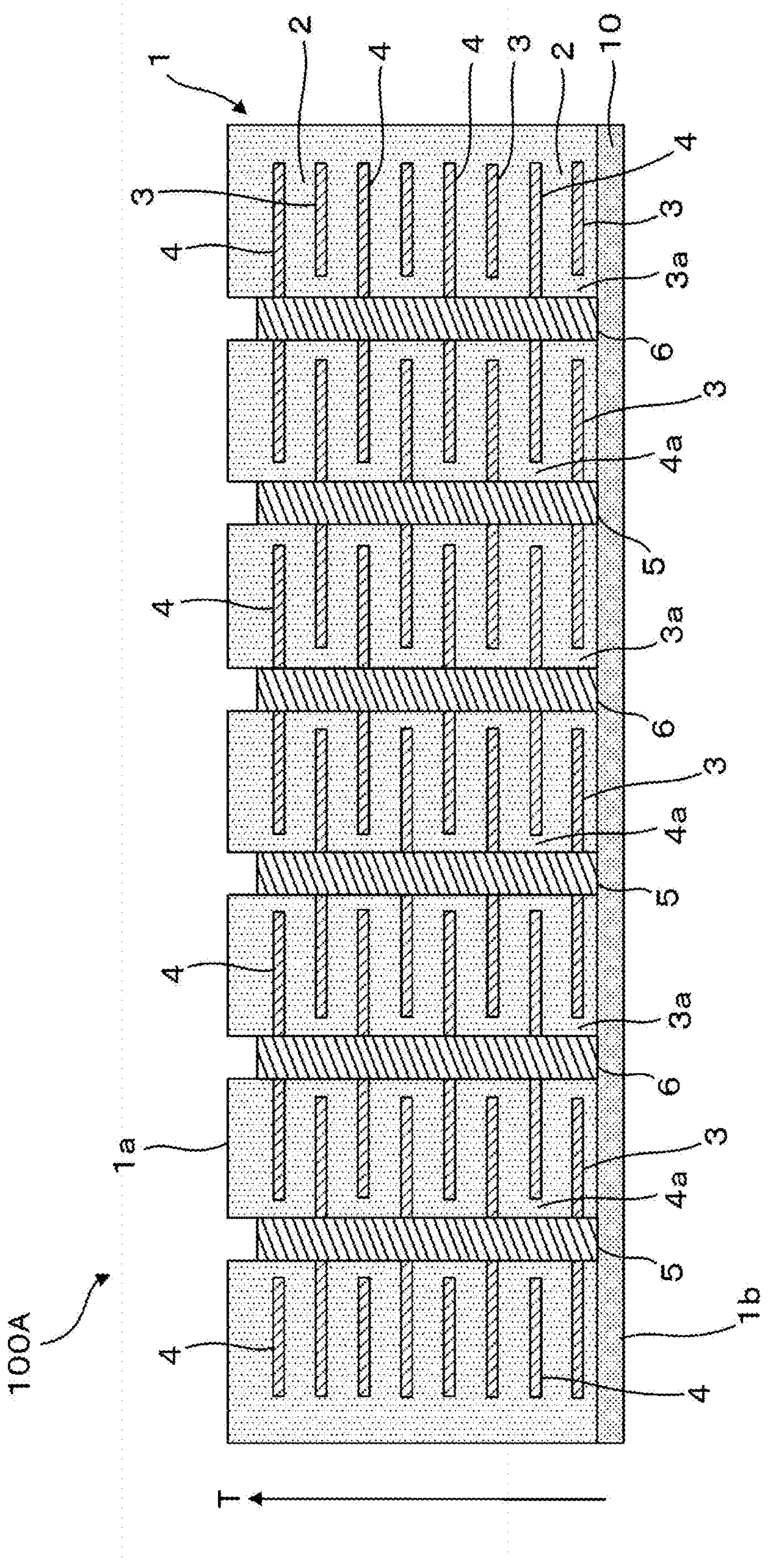
FIG. 7 is a sectional view schematically showing the configuration of a modification of the multilayer ceramic capacitor of the second example embodiment of the present invention.

FIG. 7 is a sectional view schematically showing the configuration of a modification of the multilayer ceramic capacitor 100A of the second example embodiment. The cutting position of the sectional view shown in FIG. 7 is the same or substantially the same as the cutting position of the sectional view shown in FIG. 6.

The multilayer ceramic capacitor 100A shown in FIG. 7 differs from the multilayer ceramic capacitor 100A shown in FIG. 6 in the positions of the end portions of the first via conductors 5 and the second via conductors 6. Specifically, the end portions of the first via conductors 5 and the second via conductors 6 on the first main surface 1*a* side are located more inward in the lamination direction T than the first main surface 1*a* and are not exposed at the first main surface 1*a*.

If the outer layer 10 is provided on the first main surface 1*a* side of the capacitor body 1, the multilayer ceramic capacitor 100A is configured so that the end portions of the first via conductors 5 and the second via conductors 6 on the second main surface 1*b* side are not exposed at the second main surface 1*b*.

The multilayer ceramic capacitor 100A shown in FIG. 7 provides the same advantageous effects as the multilayer ceramic capacitor 100A shown in FIG. 6.

Third Example Embodiment

Figure 8:
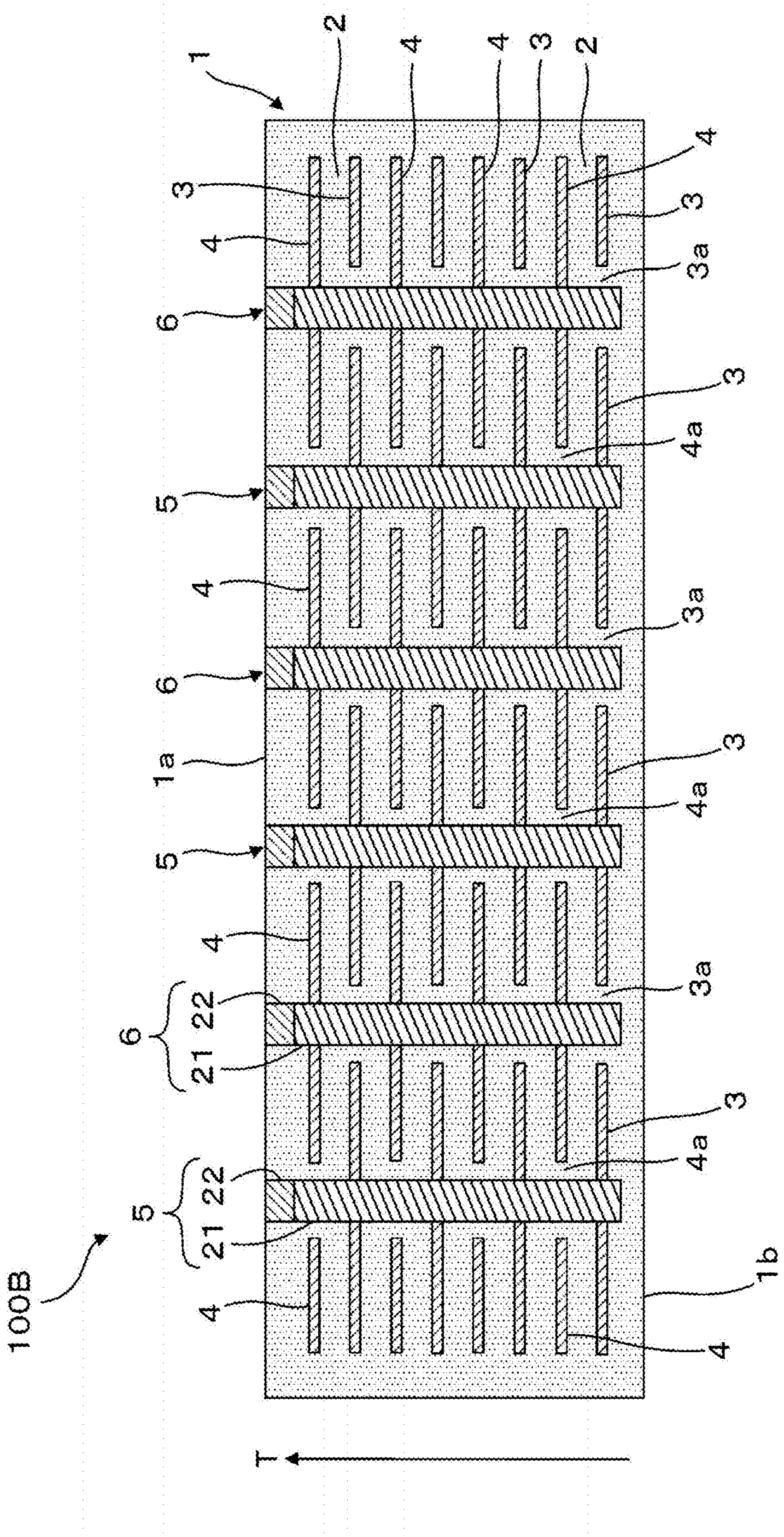
FIG. 8 is a sectional view schematically showing the configuration of a multilayer ceramic capacitor of a third example embodiment of the present invention.

FIG. 8 is a sectional view schematically showing the configuration of a multilayer ceramic capacitor 100B of a third example embodiment of the present invention. The cutting position of the sectional view shown in FIG. 8 is the same or substantially the same as the cutting position of the sectional view shown in FIG. 2.

In the multilayer ceramic capacitor 100B of the third example embodiment, as in the multilayer ceramic capacitor 100 of the first example embodiment, in the lamination direction T, the dimension of the multilayer ceramic capacitor 100B is the same or substantially the same as the dimension of the capacitor body 1.

In the example shown in FIG. 8, the first via conductors 5 and the second via conductors 6 are exposed at the first main surface 1*a* of the capacitor body 1 but not exposed at the second main surface 1*b*. However, the first via conductors 5 and the second via conductors 6 may be exposed at the second main surface 1*b* as well.

In the present example embodiment, each of the first via conductors 5 and the second via conductors 6 includes a first material layer 21 and a second material layer 22 made of a material different from the first material layer 21. The second material layer 22 is provided at end portions of the first via conductors 5 and the second via conductors 6 in the lamination direction T, the end portions being at least one of open end portions whose surfaces are not covered. In the example shown in FIG. 8, the second material layer 22 is provided at, of the end portions of the first via conductors 5 and the second via conductors 6, open end portions on the first main surface 1*a* side of the capacitor body 1 and is exposed at the first main surface 1*a*. However, the second material layer 22 does not have to be exposed at the first main surface 1*a* of the capacitor body 1. In this case, of the first main surface 1*a* and the second main surface 1*b* of the capacitor body 1, the mounting surface is the main surface where the second material layer 22 is provided.

For example, the first material layer 21 contains Ni as a main component. For example, the second material layer 22 contains, as a main component, any one of Sn, Sn—Ag, Sn—Bi, Sn—In, Sn—Ag—Cu, and Au. Note that Sn—Ag is an alloy of Sn and Ag, Sn—Bi is an alloy of Sn and Bi, Sn—In is an alloy of Sn and In, and Sn—Ag—Cu is an alloy of Sn, Ag, and Cu. While Ni is an easily-oxidizable metal, Sn, Sn—Ag, Sn—Bi, Sn—In, Sn—Ag—Cu, and Au are metals with excellent resistance to oxidation. Thus, when the second material layer 22, which contains, for example, any one of Sn, Sn—Ag, Sn—Bi, Sn—In, Sn—Ag—Cu, and Au as the main component, is provided at at least one of open end portions of the first via conductors 5 and the second via conductors 6, the mounting reliability of the multilayer ceramic capacitor 100B can be improved. However, the main component of the first material layer 21 is not limited to Ni, and may be, for example, a metal such as Cu, Ag, Pd, Pt, Fe, Ti, Cr, or Au, an alloy containing any of these metals, or the like.

The first via conductors 5 and the second via conductors 6 can be made using, for example, a single kind of conductive paste for via conductors. For example, the holes in the mother multilayer body are filled with the conductive paste for via conductors containing Ni and Sn, and the mother multilayer body is segmented into pieces. When the pieces are fired after that, Sn, which has a lower melting point than Ni, emerges to the surface side. This makes it possible to form the first via conductors 5 and the second via conductors 6 including the first material layer 21 including Ni as the main component and the second material layer 22 including Sn as the main component. In this case, for example, the first material layer 21 and the second material layer 22 do not perfectly form two layers as shown in FIG. 8, and the first material layer 21 and the second material layer 22 are mainly formed such that Ni exists in an inner side portion, and Sn exists in an outer side portion.

Also, the first via conductors 5 and the second via conductors 6 may be made using two kinds of materials. For example, the holes formed in the mother multilayer body are filled with the conductive paste for via conductors which has Ni as the main component, the mother multilayer body is segmented into pieces, and the pieces are fired. The first material layer 21 including Ni as the main component is thus formed but is shrunk by the firing, which causes its end portion to be located more inward in the lamination direction T than the surface of the capacitor body 1. However, the holes in the mother multilayer body do not have to be filled up to the surface with the conductive paste for via conductors which has Ni as the main component. Next, for example, Sn is injected onto the first material layer 21, and a reflow process is performed. As a result, the second material layer 22 having Sn as the main component is formed on the first material layer 21.

Fourth Example Embodiment

Figure 9:
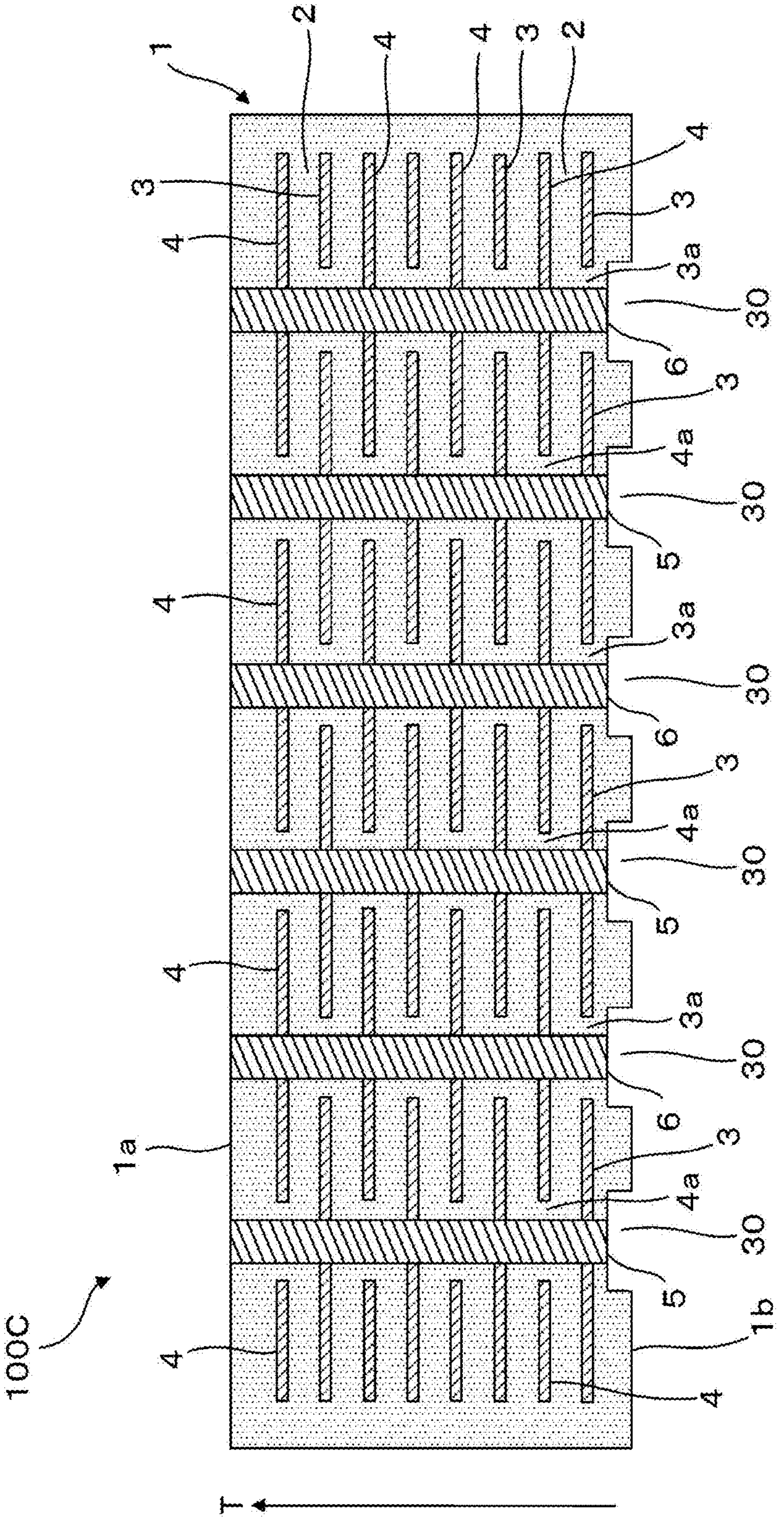
FIG. 9 is a sectional view schematically showing the configuration of a multilayer ceramic capacitor of a fourth example embodiment of the present invention.

FIG. 9 is a sectional view schematically showing the configuration of a multilayer ceramic capacitor 100C of a fourth example embodiment of the present invention. The cutting position of the sectional view shown in FIG. 9 is the same or substantially the same as the cutting position of the sectional view shown in FIG. 2.

In the multilayer ceramic capacitor 100C of the fourth example embodiment, recess portions 30 are provided at the surface of the capacitor body 1 at positions where the first via conductors 5 and the second via conductors 6 are provided when seen in the lamination direction T, the recess portions 30 being recessed inward in the lamination direction T. For example, the recess portions 30 can be formed after the fabrication of the mother multilayer body by removing a portion of the surface through application of layer light or by providing dents using a pressing machine or the like.

In the example shown in FIG. 9, the recess portions 30 are provided at the second main surface 1*b* of the capacitor body 1. However, the recess portions 30 of the capacitor body 1 may be provided at the first main surface 1*a* or may be provided at both of the first main surface 1*a* and the second main surface 1*b*.

The recess portions 30 may have any shape when seen in the lamination direction T. However, it is preferable that the recess portions 30 are provided so that the first via conductors 5 and the second via conductors 6 may be completely exposed when seen in the lamination direction T. In the example shown in FIG. 9, in any given direction orthogonal or substantially orthogonal to the lamination direction T, the dimension of the recess portions 30 is larger than the dimensions of the first via conductors 5 and the second via conductors 6.

In the example shown in FIG. 9, the first via conductors 5 and the second via conductors 6 are both exposed at the recess portions 30 of the capacitor body 1. Also, the first via conductors 5 and the second via conductors 6 are both exposed at the first main surface 1*a*. However, the first via conductors 5 and the second via conductors 6 do not have to be exposed at the first main surface 1*a*.

Figure 10:
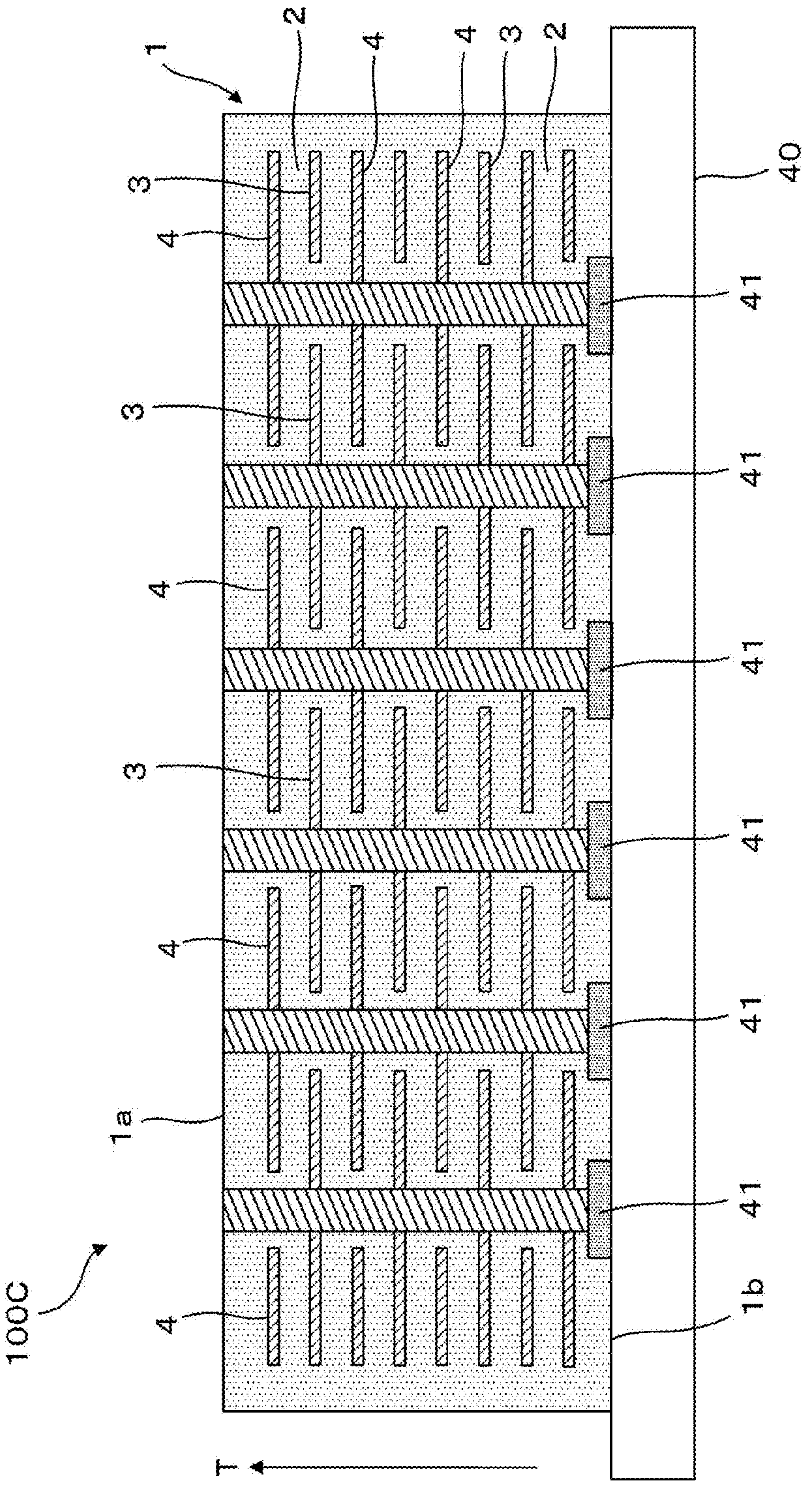
FIG. 10 is a sectional view schematically showing a state where the multilayer ceramic capacitor of the fourth example embodiment of the present invention is mounted on a mounting board using a bonding material.

The multilayer ceramic capacitor 100C of the fourth example embodiment can improve mounting strength using a bonding material such as solder, for example. Specifically, in a configuration provided with no recess portions 30, spreading of a bonding material may result in a smaller amount of bonding material left at the bonding position. In this regards, in the multilayer ceramic capacitor 100C of the present example embodiment, as shown in FIG. 10, a bonding material 41 can be retained in the recess portions 30 in mounting to a mounting board 40. Thus, the amount of bonding material 41 at the bonding position can be increased, which enables improvement in mounting strength.

In the example shown in FIG. 9, the end portion of the first via conductor 5 or the second via conductor 6 on the recess portion 30 side is at the same position as one of the inner walls forming the recess portions 30, the inner wall being orthogonal to the lamination direction T. Alternatively, the end portion of the first via conductor 5 or the second via conductor 6 on the recess portion 30 side may be located inward or outward of the above-described inner wall in the lamination direction T. Even in a case where the end portion of the first via conductor 5 or the second via conductor 6 is located outward of the above-described inner wall forming the recess portion 30 in the lamination direction T, the end portion of the first via conductor 5 or the second via conductor 6 does not protrude more outward in the lamination direction T than the surface of the capacitor body 1 other than the recess portion 30.

As described above, in the multilayer ceramic capacitor 100C shown in FIG. 9, in any given direction orthogonal or substantially orthogonal to the lamination direction T, the dimension of the recess portions 30 is larger than the dimensions of the first via conductors 5 and the second via conductors 6. As an alternative configuration, in any given direction orthogonal or substantially orthogonal to the lamination direction T, the dimension of the recess portions 30 may be the same or substantially the same as the dimensions of the first via conductors 5 and the second via conductors 6. The multilayer ceramic capacitor 100 shown in FIG. 3 is a multilayer ceramic capacitor with such a configuration and can therefore be said to be the multilayer ceramic capacitor of the fourth example embodiment.

The present disclosure is not limited to the example embodiments and modifications thereof described above and can be applied and modified variously within the scope of the present invention. For example, the characteristic configurations of the example embodiments and their modifications described above can be combined as needed.

Figure 11A:
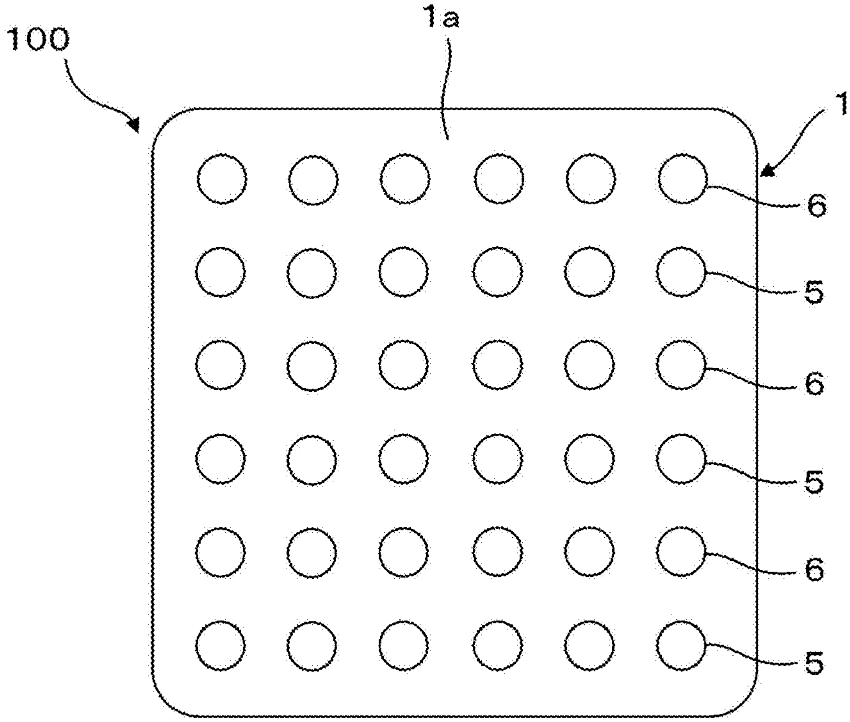
FIG. 11A is a plan view schematically showing the configuration of a multilayer ceramic capacitor the shape of which as seen in the lamination direction is a quadrilateral with round corners.
Figure 11B:
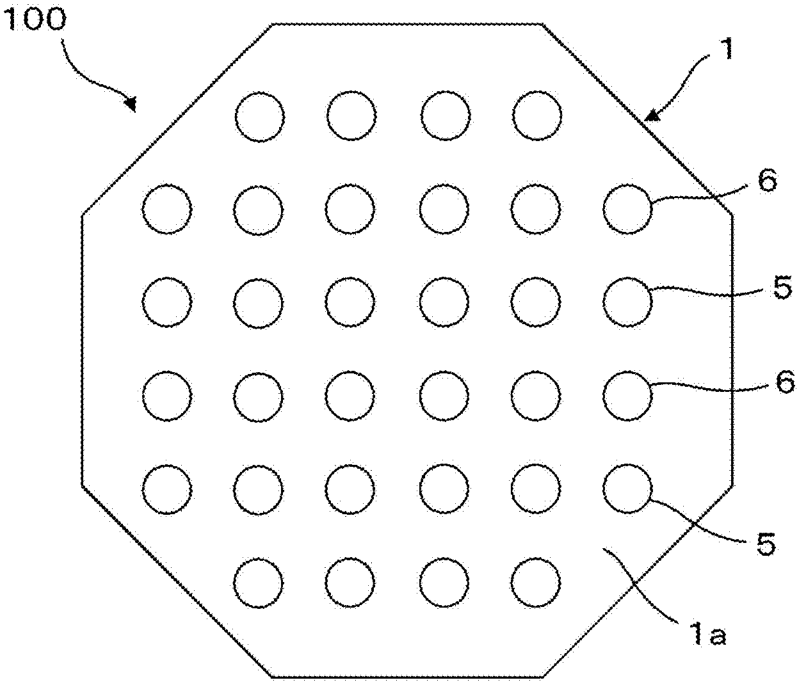
FIG. 11B is a plan view schematically showing the configuration of a multilayer ceramic capacitor the shape of which as seen in the lamination direction is an octagon.

Although the multilayer ceramic capacitor 100 shown in FIG. 1 has a square or substantially square shape when seen in the lamination direction T, it may be rectangular or substantially rectangular, or have other shapes. For example, the shape of the multilayer ceramic capacitor 100 as seen in the lamination direction T may be a quadrilateral with round corners as shown in FIG. 11A or may be an octagon as shown in FIG. 11B.

Figure 12A:
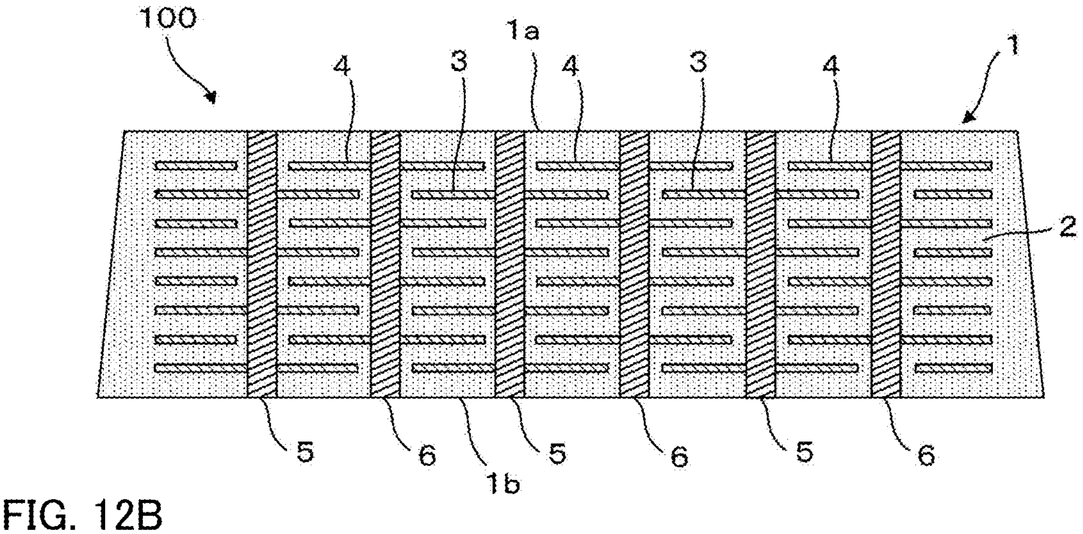
FIG. 12A is a sectional view schematically showing the configuration of a multilayer ceramic capacitor with slanted side surfaces.
Figure 12B:
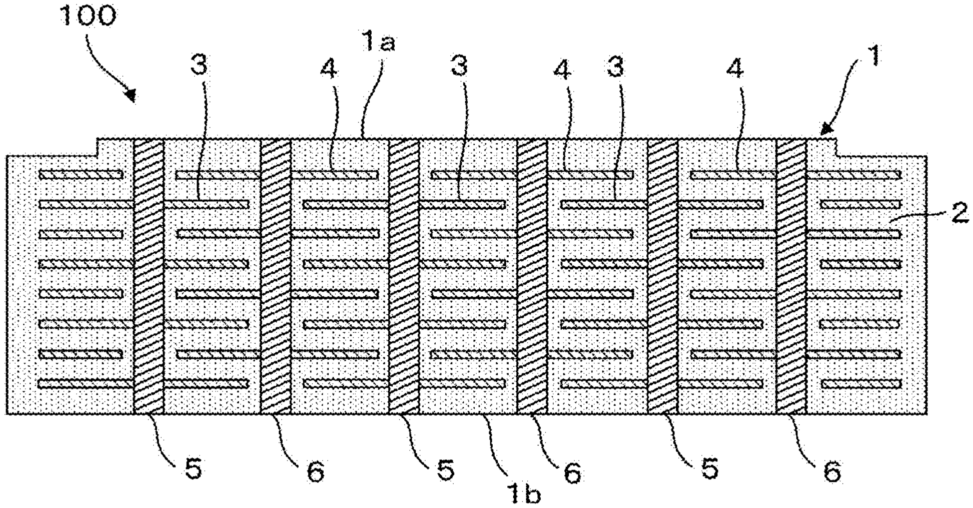
FIG. 12B is a sectional view schematically showing the configuration of a multilayer ceramic capacitor shaped such that at a main surface of the capacitor body, end portions in a direction orthogonal or substantially orthogonal to the lamination direction are recessed inward in the lamination direction compared to the other portion.

In the multilayer ceramic capacitor 100 shown in FIGS. 1 and 2, the side surfaces of the capacitor body 1 are orthogonal or substantially orthogonal to the first main surface 1*a* and the second main surface 1*b*. However, they may be slanted or inclined as shown in FIG. 12A. Also, as shown in FIG. 12B, at at least one of the first main surface 1*a* and the second main surface 1*b* of the capacitor body 1, end portions in a direction orthogonal or substantially orthogonal to the lamination direction T may be recessed inward in the lamination direction T compared to the other portion.

Figure 13A:
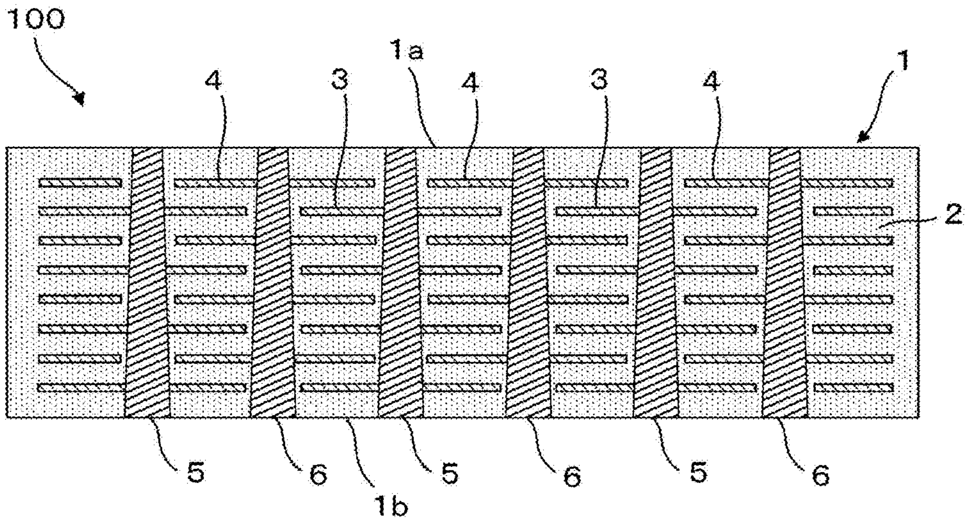
FIG. 13A is a sectional view schematically showing the configuration of a multilayer ceramic capacitor including first via conductors and second via conductors whose dimension in a direction orthogonal or substantially orthogonal to the lamination direction gradually becomes larger from one end portion to the other end portion in the lamination direction.

In the multilayer ceramic capacitor 100 shown in FIG. 2, the dimensions of the first via conductors 5 and the second via conductors 6 are the same or substantially the same at any given position in the lamination direction T. Alternatively, they may be different. For example, as shown in FIG. 13A, the first via conductors 5 and the second via conductors 6 may be shaped such that the dimension in a direction orthogonal or substantially orthogonal to the lamination direction T gradually increases from one end portion to the other end portion in the lamination direction T. In a case where the first via conductors 5 and the second via conductors 6 have a columnar shape, the diameter gradually increases from one end portion to the other end portion in the lamination direction T.

Figure 13B:
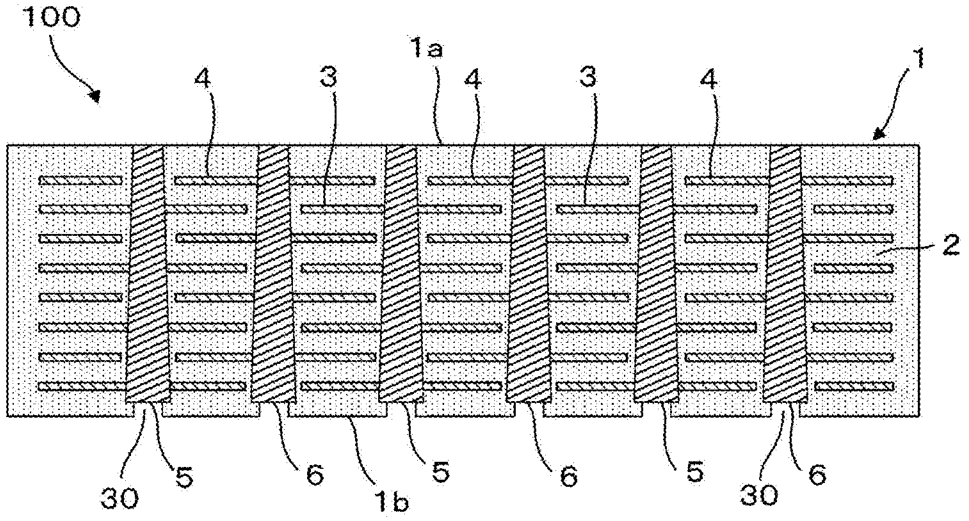
FIG. 13B is a sectional view schematically showing the configuration of a multilayer ceramic capacitor which is the multilayer ceramic capacitor shown in FIG. 13A provided with recess portions.

The multilayer ceramic capacitor 100 shown in FIG. 13A may include the recess portions 30 (see FIG. 13B) similar to the multilayer ceramic capacitor 100C of the fourth example embodiment.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:

a capacitor body including dielectric layers, first inner electrodes, and second inner electrodes that are laminated;

a first via conductor inside the capacitor body and electrically connected to the first inner electrodes; and a second via conductor inside the capacitor body and electrically connected to the second inner electrodes; wherein in a lamination direction in which the dielectric layers, the first inner electrodes, and the second inner electrodes are laminated, a dimension of the multilayer ceramic capacitor is the same or substantially the same as a dimension of the capacitor body;

recess portions are provided at a surface of the capacitor body at positions where the first via conductor and the second via conductor are provided when seen in the lamination direction, the recess portions being open and recessed inward in the lamination direction; and at least one input/output terminal is provided at an end of at least one the first and second via conductors in the lamination direction.

2. The multilayer ceramic capacitor according to claim 1, wherein, in the lamination direction, a dimension of the first via conductor and a dimension of the second via conductor are smaller than the dimension of the capacitor body.

3. The multilayer ceramic capacitor according to claim 2, wherein the capacitor body includes an outer layer at an outer side portion in the lamination direction, which has higher strength than the dielectric layers, and which covers one end portion of each of the first via conductor and the second via conductor in the lamination direction.

4. The multilayer ceramic capacitor according to claim 1, wherein the first via conductor and the second via conductor each include a first material layer and a second material layer different from the first material layer; and the second material layer is provided at end portions of the first via conductor and the second via conductor in the lamination direction, the end portions being open end portions with surfaces that are not covered.

5. The multilayer ceramic capacitor according to claim 4, wherein the second material layer includes at least one of Sn, Sn—Ag, Sn—Bi, Sn—In, Sn—Ag—Cu, and Au as a main component.

6. The multilayer ceramic capacitor according to claim 1, wherein each of the dielectric layers includes $BaTiO_3$, $CaTiO_3$, $SrTiO_3$, $SrZrO_3$, or $CaZrO_3$ as a main component.

7. The multilayer ceramic capacitor according to claim 6, wherein each of the dielectric layers includes at least one of Mn compounds, Fe compounds, Cr compounds, Co compounds, or Ni compounds, as an accessory component.

8. The multilayer ceramic capacitor according to claim 1, wherein the capacitor body has a dimension in a longitudinal direction of about 0.3 mm or more and about 3.0 mm or less, a dimension in a lateral direction of about 0.3 mm or more and about 3.0 mm or less, and the dimension in the lamination direction of about 50 μm or more and about 200 μm or less.

9. The multilayer ceramic capacitor according to claim 1, wherein each of the first inner electrodes and the second inner electrodes includes Ni, Cu, Ag, Pd, Pt, Fe, Ti, Cr, Sn, or Au or an alloy including at least one of Ni, Cu, Ag, Pd, Pt, Fe, Ti, Cr, Sn, or Au as a main component.

10. The multilayer ceramic capacitor according to claim 1, wherein each of the first inner electrodes and the second inner electrodes has a thickness of about 0.3 μm or more and about 1.0 μm or less.

11. The multilayer ceramic capacitor according to claim 1, wherein a total numbers of the first and second inner electrodes is 10 layers or more and 150 layers or less.

12. The multilayer ceramic capacitor according to claim 1, wherein each of the first via conductor and the second via conductor includes Ni, Cu, Ag, Pd, Pt, Fe, Ti, Cr, Sn, or Au or an alloy including at least one of Ni, Cu, Ag, Pd, Pt, Fe, Ti, Cr, Sn, or Au as a main component.

13. The multilayer ceramic capacitor according to claim 1, wherein each of the first via conductor and the second via conductor has a columnar shape.

14. The multilayer ceramic capacitor according to claim 13, wherein a diameter of each of the first via conductor and the second via conductor is about 30 μm or more and about 150 μm or less.

15. The multilayer ceramic capacitor according to claim 13, wherein a distance between a center of the first via conductor and a center of the second via conductor is about 50 μm or more and about 500 μm or less.

16. A multilayer ceramic capacitor comprising:

a capacitor body including dielectric layers, first inner electrodes, and second inner electrodes that are laminated;

a first via conductor inside the capacitor body and electrically connected to the first inner electrodes; and a second via conductor inside the capacitor body and electrically connected to the second inner electrodes; wherein in a lamination direction in which the dielectric layers, the first inner electrodes, and the second inner electrodes are laminated, a dimension of the multilayer ceramic capacitor is the same or substantially the same as a dimension of the capacitor body;

recess portions are provided at a surface of the capacitor body at positions where the first via conductor and the second via conductor are provided when seen in the lamination direction, the recess portions being open and recessed inward in the lamination direction;

in the lamination direction, a dimension of the first via conductor and a dimension of the second via conductor are smaller than the dimension of the capacitor body; and the capacitor body includes an outer layer at an outer side portion in the lamination direction, which has higher strength than the dielectric layers, and which covers one end portion of each of the first via conductor and the second via conductor in the lamination direction.

17. A multilayer ceramic capacitor comprising:

a capacitor body including dielectric layers, first inner electrodes, and second inner electrodes that are laminated;

a first via conductor inside the capacitor body and electrically connected to the first inner electrodes; and a second via conductor inside the capacitor body and electrically connected to the second inner electrodes; wherein in a lamination direction in which the dielectric layers, the first inner electrodes, and the second inner electrodes are laminated, a dimension of the multilayer ceramic capacitor is the same or substantially the same as a dimension of the capacitor body;

recess portions are provided at a surface of the capacitor body at positions where the first via conductor and the second via conductor are provided when seen in the lamination direction, the recess portions being open and recessed inward in the lamination direction;

the first via conductor and the second via conductor each include a first material layer and a second material layer different from the first material layer; and the second material layer is provided at end portions of the first via conductor and the second via conductor in the lamination direction, the end portions being open end portions with surfaces that are not covered.

18. The multilayer ceramic capacitor according to claim 17, wherein the second material layer includes at least one of Sn, Sn—Ag, Sn—Bi, Sn—In, Sn—Ag—Cu, and Au as a main component.

* * * * *